March 5, 1968  R. SAPOLSKY  3,371,759
CLUTCH CONTROL FOR MECHANICAL DEVICES
Filed Feb. 7, 1967  2 Sheets-Sheet 1

INVENTOR.
ROGER SAPOLSKY
BY
*Tilberry & Body*

March 5, 1968 R. SAPOLSKY 3,371,759
CLUTCH CONTROL FOR MECHANICAL DEVICES
Filed Feb. 7, 1967 2 Sheets-Sheet 2

INVENTOR.
ROGER SAPOLSKY
BY
Meyer Tilberry & Body

United States Patent Office 3,371,759
Patented Mar. 5, 1968

3,371,759
CLUTCH CONTROL FOR MECHANICAL DEVICES
Roger Sapolsky, Saint-Gratien, France, assignor to E. W. Bliss Company, Canton, Ohio, a corporation of Delaware
Continuation-in-part of application Ser. No. 467,288, June 28, 1965. This application Feb. 7, 1967, Ser. No. 629,044
11 Claims. (Cl. 192—85)

ABSTRACT OF THE DISCLOSURE

This disclosure concerns a torque control mechanism for a fluid operable clutch such as may be found in a crank-driven press, which mechanism includes a valve to selectively connect the clutch to a source of fluid pressure or to a fluid pressure escapement and in series between the valve and pressure source, a pressure modulating valve retarding build-up of pressure in the clutch at the start causing gradual clutch engagement and thereafter responsive to a predetermined back pressure to permit a rapid rise of pressure in the clutch to prevailing line pressure and full engagement torque.

---

This invention is a continuation-in-part of copending United States patent application Ser. No. 467,288, filed June 28, 1965, now abandoned.

This invention pertains to the art of fluid operated clutch controls for mechanical presses and relates in particular to a two-stage pressure responsive control for modulating fluid actuation to the clutch drive.

The invention will be described with particular reference to a pneumatic clutch drive of the friction disc variety associated with a crank driven press, however, it will be appreciated that it is not limited to mechanical presses but may be used as a torque control mechanism generally wherever the requirements are for a clutch control having a modulated cycle of operation.

In mechanical presses, the crankshaft is provided with torque sufficient to produce, for example, one-half tonnage at midstroke, full tonnage near bottom stroke, and thereafter full tonnage continually through bottom center of the work stroke. At the point of travel of the crankshaft where a constant value of torque first produces rated tonnage, the torque capacity is thereafter controlled so that the ratio of torque to the effective lever arm of the crankshaft is a constant value which will result in development of the rated tonnage. An electro-pneumatic clutch control engages and disengages the clutch automatically in response to the angular position of the crankshaft. Such a control generally includes a pressure regulated fluid tank connected to the clutch through a solenoid operated, spring off-set, three-way, normally closed valve which is controlled by a drum switch responsive to the crankshaft position. De-energizing of the solenoid of the three-way valve blocks the path of flow from the pressure tank to the clutch and simultaneously connects the clutch to a fluid pressure escapement in the valve which lowers the pressure in the clutch to a value whereby the clutch will slip or disengage. The press can then be braked to a stop. To start the press, the solenoid is energized closing the escapement and the pressure tank is connected directly to the clutch for high initial torque to quickly accelerate the crankshaft and moving parts of the press with a minimum of clutch slippage.

One problem is to get the large mass of the press slide in motion from a standing start without straining the crankshaft or causing excessive shock to the clutch drive. A partial solution is to throttle the air intake of the three-way valve in order to slow down the build up of pressure in the clutch and produce a gradual starting action. However, if the load comes on the press too rapidly, then the throttling of the three-way valve will be a major inconvenience since the clutch will be at reduced torque at the very moment the rated tonnage of the press is required.

These and other difficulties are overcome with the present invention by modulating the fluid pressure delivered to the clutch to permit the build up of pressure gradually at the start until a predetermined torque is reached and then to permit the rapid build up to full line pressure for maximum torque.

In accordance with the invention in its broadest aspects, the torque control mechanism includes a two-stage modulating valve located in the line between the pressure tank and the three-way valve comprising a fixed orifice restriction for retarding the build up of starting pressure delivered to the clutch until a predetermined torque is reached and pressure relief means responsive to the back pressure for then increasing the clutch torque to that available with prevailing line pressure.

More specifically, the pressure modulating valve includes a housing, a movable wall sealably dividing the housing into separate chambers, a calibrated orifice in the movable wall connecting the chambers, inlet and outlet openings connecting the pressure tank and three-way valve respectively to one of the chambers, a valve seat adjacent the inlet opening, a valve member closable on the valve seat in response to displacement of the movable wall, a throttling orifice larger than the calibrated orifice bypassing the valve seat and a spring element biasing the movable wall to the valve closing position at equilibrium conditions of the chambers whereby the rate of build up of pressure in the one chamber will exceed the rate of build up in the other chamber after initial clutch engagement causing the movable wall to move to the valve opening position when the predetermined driving torque is reached.

Further, it having been found that the pressure modulating valve is quite sensitive to a change in the calibrated orifice dimension, other things being equal, a modification permits the calibrated orifice to be positioned in the housing of the valve rather than in the movable wall, hence the orifice may be drilled into a removable and easily interchangeable plug adapted to be inserted in the housing thus changing the characteristics of the valve.

The principal object of the invention is to provide a pneumatic torque control for friction disc clutches of mechanical presses insuring a gradual build up of clutch pressure at the start to reduce clutch wear and minimize shocks to the press drive mechanism.

Another object of the invention is the provision of a torque control including a fluid pressure modulating valve responsive to clutch back pressure for initiating maximum torque operation a predetermined period after initial clutch engagement.

These and other objects will be apparent by referring to the following description and drawings wherein.

Figure 1:
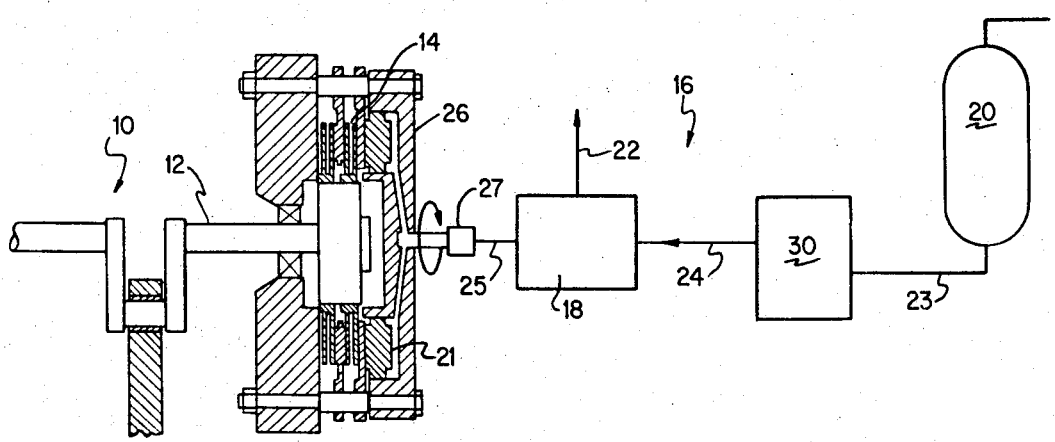
FIGURE 1 is a schematic representation of a crank driven press and clutch control therefor incorporating the invention and FIGURE 2 is a cross sectional view of the pressure modulating valve of the clutch control.

Referring now to the drawings wherein the showings are for the purpose of illustrating a preferred embodiment of the invention only and not for the purpose of limiting same, FIGURE 1 schematically shows a mechanical press drive 10 including a crank shaft 12 driven by a pneumatically operated friction disc clutch 14. Connected to the clutch 14 is an electro-pneumatic control, generally indicated at 16. The control 16 includes a solenoid operated, spring off-set, three-way, normally closed gate valve 18 which is connected to a drum switch (not shown) for operation in response to the angular position of the crankshaft 12 in a manner similar to the press control disclosed in U.S. Patent No. 2,911,080 issued Nov. 3, 1959. That is, valve 18 is normally mechanically held closed and separates a pressure tank 20 from a fluid pressure chamber 21 in the clutch 14, but is solenoid energized by the drum switch to open and connect the tank for pressurizing the chamber 21 when driving the press. When the valve 18 is closed however a fluid escapement 22 is open which connects the clutch chamber 21 to atmosphere exhausting the clutch chamber and disengaging the clutch drive. It will be appreciated that a fixed pipe system 23, 24, 25 connects the pressure tank 20 and three-way valve 18 to the rotatable clutch housing 26. A revolving joint 27 of known design connects the clutch chamber 21 with the fixed pipe system 23, 24, 25 of the control 16.

Heavy press parts such as the press slide and flywheel have an enormous inertia when they rest. If full line pressure is admitted into the clutch chamber 21 all at once, the shock in overcoming the inertia of the movable press parts and the consequent clutch wear is severe. To alleviate this problem, prior press torque control mechanisms included a line restriction between the pressure tank and the three-way gate valve. However this has the disadvantage of retarding the build up of torque too much which finds the press load requirements being reached before the full tonnage capacity of the press is available.

In accordance with the present invention, instead of a line restriction, the novel torque control 16 includes a pressure modulating valve 30 between the pressure tank 20 and three-way gate valve 18.

Figure 2:
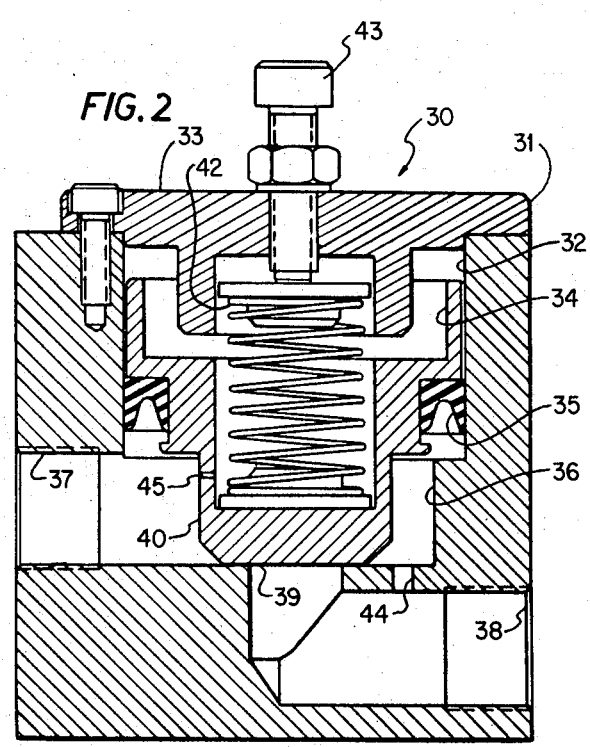

Referring now to FIGURE 2, the pressure modulating valve 30 is designed to accomplish the two principal tasks of the torque control mentioned before which are: (1) to permit the build up of pressure in the clutch gradually at first and, (2) at a predetermined back pressure, apply full line pressure to the clutch to achieve maximum torque.

The valve consists essentially of a housing 31 having a cylindrical inner chamber 32 which is closed at one end by a cover 33 and at the other end by a movable wall 34 sealably engaging walls of chamber 32 by means of radial seal 35. Another chamber 36 of somewhat smaller diameter than chamber 32 exists in the lower part of housing 31 and opens laterally on one side to form an outlet 37 intended to be joined with the inlet of the three-way gate valve 18 by way of fixed piping 24 and on the opposite side opening laterally to form an inlet 38 intended to be joined with the compressed air tank 20 by way of piping 23. The inlet 38 terminated centrally of the housing and coaxially with respect to cylindrical chambers 32, 36 to form a seat 39.

The movable wall 34 is provided with an extension which forms a clack valve 40 adapted to close on the seat 39 at the same time cutting off direct communication of compressed air from tank 20 to the inlet of the three-way gate valve 18. A coil spring 42, the tension of which can be adjusted by screw 43, biases the movable wall 34 and consequently clack valve 40 to the valve closing position on seat 39. A throttling orifice 44 connects the inlet 38 with chamber 36 bypassing the main fluid flow passage through the seat 39. A calibrated opening 45 of somewhat smaller diameter than throttling orifice 44 is located in the extension forming clack valve 40, the purpose of which is to connect chamber 32 with chamber 36 for reasons to be explained hereinafter.

When the press is idle, the three-way gate valve 18 is de-energized which means it is in the normally closed position separating pressure tank 20 from clutch 14 and connecting clutch chamber 21 to the escapement 22. Under these conditions the chambers 32, 36 of the pressure modulating valve 30 are at equilibrium which means that the pressure in chamber 32 is substantially equal to the pressure in chamber 36 under which conditions the coil spring 42 is effective to bias the movable wall 34 and clack valve 40 to the sealing position on seat 39 as illustrated in FIGURE 2. The chambers 32, 36 are filled with air at maximum pressure or the prevailing pressure of tank 20.

Upon energizing the solenoid of the three-way gate valve 18, the escapement 22 is closed and the pressure line 23, 24, 25 from tank 20 to the clutch chamber 21 is opened to fluid flow through the clack valve 40 by way of throttling orifice 44. The pressure inside the housing 31 will drop but the rate of decrease of pressure in chamber 32 will not be as rapid as the rate of decrease in chamber 36 due to the calibrated orifice 45, thus the clack valve 40 will remain closed and compressed air from tank 20 will pass only through the throttling orifice 44 retarding full engaging pressure of the clutch 14 so that the press will start running with a reduced acceleration.

At a predetermined build-up in driving torque, the pressure in chamber 36 begins to increase due to the gradual increase of pressure in the system. Since the chamber 32 cannot keep pace with the rise in pressure in chamber 36, the latter being in direct communication with the clutch and chamber 32 being restricted due to the small opening 45, a point will be reached when the movable wall 34 will rise against the force of spring 42 thus allowing the very rapid filling of the clutch chamber 21 to the pressure level prevailing in the compressed air tank 20.

During operation, the pressure in chamber 32 catches up with the pressure in chamber 36 reestablishing the equilibrium condition which permits the clack valve 40 to return to the closed positon thus getting ready for the next operating cycle. The tension of spring 42 can be adjusted so that it becomes easily possible to determine the desired initial pressure at which the clack valve 40 opens up fully. The calibration of orifice 45 is fixed and permits diminishing the displacement of the movable wall 34. In combination, the spring 42 and calibration of orifice 45 are effective to vary the responsiveness of the control in order to meet the requirements of various speeds of operation.

Figure 3:
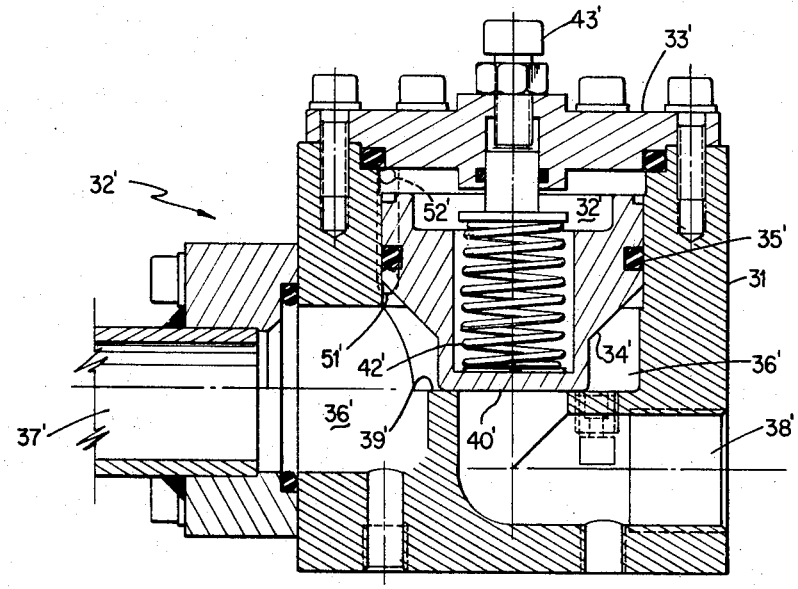
FIGURE 3 is a vertical sectional view showing another form of the invention employing a calibrated orifice modification.
Figure 4:
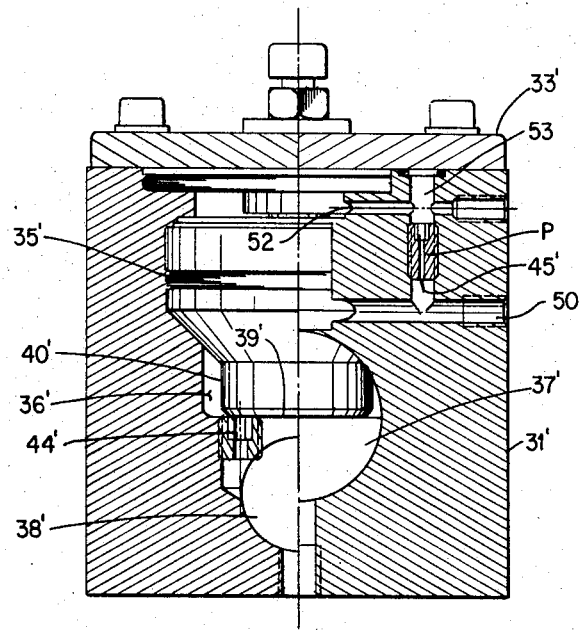
FIGURE 4 is an offset sectional view showing the calibrated orifice of FIGURE 3.

In a modification of the invention shown in FIGURES 3 and 4 in which similar parts will be identified by like numerals with the addition of a prime mark, the calibrated orifice 45' is positioned in the housing 31' rather than in the movable wall 34' which forms the clack valve 40'. The object of this modification is to take into account the fact that the pressure modulating valve responds to a change in the calibrated orifice dimensions in a rather critical fashion hence it is drilled in a removable and easily interchangeable plug P which can be readily removed and replaced with one having a different calibrated orifice dimension to fit the modulating characteristics desired. The valve in FIGURES 3 and 4 is similar in all essential respects to that shown in FIGURE 2 with the exception that the housing 31' is drilled with parallel transverse passages 50, 52 intersected by a vertical passage 53 adapted to receive the plug P. The transverse passage 50 remains slightly uncovered at 51 (FIG. 3) by the movable wall 34' and thus communicates with the back pressure in the clutch prevailing in chamber 36'. From passage 50 the back pressure reaches chamber 32' only through the calibrated orifice 45' and passage 52 which opens into chamber 32' behind the movable wall 34'.

In operation a change of orifice restriction from 1 mm. to 0.8 mm. will increase the initial slow pressure build up from 29 seconds to approximately 34 seconds before the valve fully opens to permit full clutch torque.

From the foregoing, it will be appreciated that the description of the invention is with reference to a preferred embodiment only and it is possible for persons skilled in the art to modify details while conforming to the basic idea of the invention as defined by the appended claims.

I claim:
1. A torque control mechanism comprising
   a fluid operable clutch,
   a source of fluid pressure connectable to the clutch,
   a fluid pressure escapement connectable to the clutch,
   a valve means to selectively connect the clutch to the source of fluid pressure or to the fluid pressure escapement, and
   pressure modulation means connected between the valve means and fluid pressure source including a pair of chambers normally at equilibrium pressure,
   second valve means controlled by said chamber pressures seated in the pressure line to said other valve means at equilibrium pressure,
   a throttling orifice constituting a by-pass restriction around said seated second valve means permitting less than full pressure build-up for a gradual clutch engagement at the start and
   means rendering said chamber pressures responsive to clutch back pressure to a different degree so that said second valve means becomes unseated at a predetermined differential pressure in said chambers permitting a rapid rise of pressure in the clutch to the prevailing line pressure.

2. A torque control mechanism comprising
   a fluid operable clutch,
   a single source of fluid pressure connectable to the clutch,
   a fluid pressure escapement connectable to the clutch,
   a valve member to selectively connect the clutch to the single source of fluid pressure or to the fluid pressure escapement and
   pressure modulation means connected between the valve member and fluid pressure source comprising
   a housing,
   a movable wall sealably dividing the housing into separate chambers,
   a calibrated orifice in the movable wall connecting the chambers, inlet and outlet passages in the housing connecting the fluid pressure source and valve member respectively to one of the chambers,
   a valve seat in the inlet passage adjacent said one chamber,
   valve means closable on the seat in response to the position of the movable wall to shut off pressure from the pressure source to the one chamber through said valve seat, said one chamber connectable directly to the clutch through the valve member,
   a restricted orifice larger than said calibrated orifice by-passing the valve seat and connecting the fluid pressure source to said one chamber, and
   spring means biasing the movable wall to the valve closing position at equilibrium conditions of said chambers whereby after initial clutch engagement the rate of increase of back pressure in the one chamber will exceed the rate of increase in the other chamber due to the calibrated orifice in the movable wall causing the latter to move to the valve opening position momentarily until equilibrium conditions are restored thereby delivering full line pressure to the clutch.

3. A torque control mechanism as set forth in claim 2 wherein the chambers are coaxially aligned with the valve seat and the valve means is formed as an integral extension of said movable wall.

4. In combination with a power press having a fluid operable friction disc clutch drivingly engageable with a crankshaft,
   a clutch torque control mechanism comprising
   a source of fluid pressure connectable to the clutch,
   a fluid pressure escapement connectable to the clutch,
   a valve means to selectively connect the clutch to the source of fluid pressure or to the fluid pressure escapement, and pressure modulation means connected between the valve means and fluid pressure source including a pair of chambers normally at equilibrium pressure,
   second valve means controlled by said chamber pressures seated in the pressure line to said other valve means at equilibrium pressure,
   a throttling orifice constituting a by-pass restriction around said seated second valve means permitting less than full pressure build-up for a gradual clutch engagement at the start and
   means rendering said chamber pressures responsive to clutch back pressure to a different degree so that said second valve means becomes unseated at a predetermined differential pressure in said chambers permitting a rapid rise of pressure in the clutch to the prevailing line pressure.

5. In combination with a power press having a fluid operable friction disc clutch drivingly engageable with a crankshaft
   a clutch torque control mechanism comprising
   a single source of fluid pressure connectable to the clutch,
   a fluid pressure escapement connectable to the clutch,
   a valve member to selectively connect the clutch to the single source of fluid pressure or to the fluid pressure escapement and
   pressure modulation means connected between the valve member and fluid pressure source comprising
   a housing,
   a movable wall sealably dividing the housing into separate chambers,
   a calibrated orifice in the movable wall connecting the chambers,
   inlet and outlet passages in the housing connecting the fluid pressure source and valve member respectively to one of the chambers,
   a valve seat in the inlet passage adjacent said one chamber,
   valve means closable on the seat in response to the position of the movable wall to shut off pressure from the pressure source to the one chamber through said valve seat, said one chamber connectable directly to the clutch through the valve member,
   a restricted orifice larger than said calibrated orifice by-passing the valve seat and connecting the fluid pressure source to said one chamber, and
   spring means biasing the movable wall to the valve closing position at equilibrium conditions of said chambers whereby after initial clutch engagement the rate of increase of back pressure in the one chamber will exceed the rate of increase in the other chamber due to the calibrated orifice in the movable wall causing the latter to move to the valve opening position momentarily until equilibrium conditions are restored thereby delivering full line pressure to the clutch.

6. The combination as set forth in claim 5 wherein the chambers are coaxially aligned with the valve seat and the valve means is formed as an integral extension of said movable wall.

7. A pressure modulation valve responsive to variable downstream line pressure comprising
   a housing,
   a movable wall sealably dividing the housing into separate chambers,
   a calibrated orifice in the movable wall connecting the chambers,
   an inlet passage connectable to a source of fluid pressure opening into one of said chambers,
   a valve seat in the inlet passage adjacent said one chamber,
   an outlet passage from said one chamber connectable to a downstream line,
   valve means closable on the seat in response to the position of the movable wall to shut off pressure from the pressure source to the one chamber through the valve seat, a restricted orifice larger than said calibrated orifice bypassing the valve seat and connecting the fluid pressure source to said one chamber, the latter being directly connectable to downstream line pressure, and spring means biasing the movable wall to the valve closing position at equilibrium conditions of said chambers whereby the rate of increase of downstream line pressure in the one chamber will exceed the rate of increase in the other chamber due to the calibrated orifice in the movable wall causing the latter to move to the valve opening position momentarily until equilibrium conditions are restored in the chambers.

8. A pressure modulation valve as set forth in claim 7 wherein the chambers are coaxially aligned with the valve seat and the valve means is formed as an integral extension of said movable wall.

9. A torque control mechanism as set forth in claim 1 wherein said means rendering the chamber pressure responsive to clutch back pressure comprises an orifice restriction between said pair of chambers, the dimensions of which said magnitude of clutch back pressure determine the differential pressure between said chambers.

10. A torque control mechanism as set forth in claim 9 wherein said orifice restriction is located in removable and interchangeable structure of said pressure modulation means to permit substitution of a different sized orifice in order to change the characteristics of modulation.

11. A torque control mechanism as set forth in claim 10 wherein the pressure modulation means includes a housing and a movable wall sealably dividing the housing into said pair of chambers and said removable structure includes a plug insertable in a passageway formed in said housing and communicating on opposite sides of said movable wall.

References Cited

UNITED STATES PATENTS

| | | | |
|---|---|---|---|
| 3,042,165 | 1/1962 | Yokel | 192—85 |
| 3,042,166 | 1/1962 | Crane | 192—85 |

DONLEY J. STOCKING, *Primary Examiner.*

ARTHUR T. McKEON, *Examiner.*